United States Patent
Alexandrov et al.

(10) Patent No.: US 8,437,157 B2
(45) Date of Patent: May 7, 2013

(54) POWER LINE CURRENT FED POWER SUPPLIES PRODUCING STABLE LOAD CURRENTS AND RELATED METHODS

(75) Inventors: Felix I. Alexandrov, Bedford, MA (US); Michael L. Williams, Newburyport, MA (US)

(73) Assignee: Marmon Utility, LLC, Milford, NH (US)

( * ) Notice: Subject to any disclaimer, the term of this patent is extended or adjusted under 35 U.S.C. 154(b) by 50 days.

(21) Appl. No.: 13/049,511

(22) Filed: Mar. 16, 2011

(65) Prior Publication Data

US 2012/0236611 A1   Sep. 20, 2012

(51) Int. Cl.
G05F 1/33 (2006.01)
H02M 5/42 (2006.01)
H02M 7/04 (2006.01)
H02M 7/68 (2006.01)

(52) U.S. Cl.
USPC .............................................. 363/82; 363/90

(58) Field of Classification Search .......... 323/247–251; 363/126–127, 12, 82, 90
See application file for complete search history.

(56) References Cited

U.S. PATENT DOCUMENTS

| | | | | |
|---|---|---|---|---|
| 2,739,282 A | * | 3/1956 | Evans | 363/82 |
| 2,764,725 A | * | 9/1956 | Buie | 363/77 |
| 3,098,971 A | | 7/1963 | Richardson | |
| 3,747,104 A | | 7/1973 | Pansini | |
| 5,053,774 A | | 10/1991 | Schuermann et al. | |
| 5,479,159 A | | 12/1995 | Kelly et al. | |
| 5,539,300 A | | 7/1996 | Mathieu | |
| 5,565,783 A | | 10/1996 | Lau et al. | |
| 5,726,554 A | * | 3/1998 | Freiman et al. | 320/157 |
| 5,978,242 A | * | 11/1999 | Raad et al. | 363/89 |
| 6,212,049 B1 | | 4/2001 | Spencer et al. | |
| 6,496,391 B1 | | 12/2002 | Ikeda et al. | |
| 6,791,284 B1 | | 9/2004 | Levy | |
| 6,847,300 B2 | | 1/2005 | Yee et al. | |
| 7,006,010 B2 | | 2/2006 | Thomas et al. | |
| 7,030,777 B1 | | 4/2006 | Nelson et al. | |
| 7,050,808 B2 | | 5/2006 | Janusz et al. | |
| 7,123,140 B1 | | 10/2006 | Denes | |
| 7,126,493 B2 | | 10/2006 | Junker et al. | |
| 7,181,164 B2 | | 2/2007 | Lee et al. | |
| 7,187,275 B2 | | 3/2007 | McCollough, Jr. | |
| 7,295,133 B1 | | 11/2007 | McCollough, Jr. | |
| 7,369,056 B2 | | 5/2008 | McCollough, Jr. | |

(Continued)

OTHER PUBLICATIONS

"Datasheet HC Power Series Ultracapacitors," Maxwell Technologies, Inc. 2010, pp. 1-4.

(Continued)

Primary Examiner — Jue Zhang
(74) Attorney, Agent, or Firm — Hayes Soloway P.C.

(57) ABSTRACT

Power line current fed power supplies producing stable load currents and related methods are described. The power supplies may include a current transformer coupled to an inductive network. In some embodiments, the current transformer operates in saturation mode. In some embodiments, a substantially constant DC current is generated having a magnitude that remains substantially constant despite variations of the magnitude of AC current in the power line.

52 Claims, 8 Drawing Sheets

U.S. PATENT DOCUMENTS

| | | |
|---|---|---|
| 7,710,069 B2 | 5/2010 | McCollough |
| 7,808,400 B2 | 10/2010 | McCollough |
| 2003/0025612 A1 | 2/2003 | Holmes et al. |
| 2008/0122642 A1* | 5/2008 | Radtke et al. .................. 340/660 |
| 2009/0002164 A1 | 1/2009 | Brillhart et al. |
| 2010/0013457 A1 | 1/2010 | Nero, Jr. |
| 2010/0084920 A1 | 4/2010 | Banting et al. |

OTHER PUBLICATIONS

"Maxwell Active Cell Voltage Management Electronics," Revision 1.0, Feb. 17, 2007, Maxwell Technologies, Inc., San Diego, CA, pp. 1-9.

"Product Guide, BOOSTCAP® Ultracapacitors," Maxwell Technologies 2009, pp. 1-56.

* cited by examiner

POWER LINE CURRENT FED POWER SUPPLIES PRODUCING STABLE LOAD CURRENTS AND RELATED METHODS

BACKGROUND

1. Field

The technology described herein relates to alternating current (AC) to direct current (DC) power supplies, and more particularly to power line current fed power supplies producing stable load currents and methods relating to the same.

2. Related Art

The operation of utility power lines can be monitored with sensors. Utility power lines typically undergo changes in operation, including expected and unexpected changes. Expected changes include changes in the amount of current on the utility power line due to changes in user demand. Unexpected changes include changes in the amount of current on the utility power line due to fault conditions. Sensors can be used to monitor the described changes on the utility power line, and therefore provide information useful in assessing operation of the utility power line.

Sensors used to monitor the operation of utility power lines are typically powered in one of two manners, presuming the sensors operate on direct current (DC) power. One manner of powering such sensors is with a battery. A second manner of powering such sensors is with an alternating current (AC) to direct current (DC) power supply which uses the AC current of the utility power line being monitored to produce a DC output signal for powering the sensor.

FIG. 13 is a circuit schematic of a conventional AC to DC power supply switching circuit providing a voltage output. The power supply includes a front end current transformer CT1, which simultaneously measures power line current and supplies current to power electronic circuits. The current transformer CT1 has a split magnetic core and operates in a linear mode. The current transformer CT1 is built with a single turn primary winding utilizing an AC power line wire or a cable, which is an ideal AC current source with variable line current $I_L$. The current transformer CT1 also has a secondary winding W.

Multiple components are connected to the secondary winding W of the current transformer CT1. A ballast capacitor C1 is connected across the secondary winding W and reduces the output current of the current transformer. A rectifier bridge having diodes D1, D2, D3 and D4 is also coupled to the secondary winding W of the current transformer CT1.

The power supply in FIG. 13 also includes an on/off parallel switching voltage regulator to absorb extra current after the rectifier bridge. The voltage regulator includes a transistor switch SW connected in parallel to the output of the diode bridge, a comparator U1 controlling transistor switch SW, a series diode D5 for reverse current protection, a Zener diode Z1 for over voltage protection, an output energy storage capacitor C2, and a voltage divider with resistors R1 and R2.

Transistor switch SW is provided with a switching MOSFET M1 with gate resistors R3 and R4 and is controlled directly by the comparator U1 via a series gate resistor R3 as the switching frequency is low. When the output of the voltage divider formed by R1 and R2 is higher than the reference voltage, the comparator turns the switch SW "on," diverting rectified current from the output of the power supply. When the output voltage Vout becomes too low, the switch turns "off," restoring current flow for charging capacitor C2.

To reduce current in the switch SW the transformer CT1 is provided with an increased number of turns in the secondary winding W, which results in the output voltage Vout being higher (about 23V) than many electronic blocks require. Thus, the power supply of FIG. 13 is conventionally provided with a step down series switching regulator (not shown) that steps down the output voltage Vout from about 23V to 3.3V.

SUMMARY

According to one aspect, a power supply circuit comprises a current transformer comprising a winding wrapped at least partially around a core, the core adapted to be placed at least partially around a power line, and the winding configured to provide a current transformer output current when the core is placed at least partially around the power line. The power supply circuit further comprises an inductive circuit coupled to the winding to receive the current transformer output current, the inductive circuit comprising an inductor configured in series with the current transformer. The inductive circuit is configured to provide a substantially constant direct current (DC) current in response to an alternating current in the current carrying wire for at least one mode of operation of the power supply circuit.

According to another aspect, a method of operating a power supply is provided, the method comprising producing a transformer output current from a secondary winding of a current transformer in response to an alternating current being input to the current transformer. The method further comprises receiving the transformer output current at an input of an inductive circuit coupled to the current transformer. The method further comprises providing a substantially constant direct current (DC) current from the inductive circuit in response to receiving the transformer output current at the input of the inductive circuit for at least one mode of operation of the power supply.

According to another aspect, a power circuit for converting an alternating current (AC) input current to a direct current (DC) current is provided. The power circuit comprises a current transformer couplable to a power line, the current transformer comprising a toroidal magnetic core configured to be placed about the power line. The current transformer further comprises a secondary winding wound around at least a portion of the toroidal magnetic core. The power circuit further comprises an inductor coupled in series with the secondary winding and configured to operate in a linear mode. The power supply circuit further comprises a rectification circuit coupled to the inductor. The power supply circuit further comprises a first supercapacitor and a second supercapacitor in series with the first supercapacitor. The inductor and the rectification circuit may be configured in combination to receive a current from the secondary winding of the current transformer and to provide a substantially constant DC current from a first terminal corresponding to a first terminal of the first supercapacitor in response to an AC input current in the power line for at least one mode of operation of the power circuit.

According to another aspect, an apparatus is provided comprising a power supply configured to receive an alternating current (AC) input current and provide a direct current (DC) current. The power supply comprises a current transformer configured to operate in magnetic saturation.

According to another aspect, a method of providing a power signal is provided. The method comprises receiving an alternating current (AC) input current and providing a direct current (DC) current. Providing the DC current comprises operating on the AC input current with a current transformer operating in magnetic saturation.

According to another aspect, a method for operating a power supply is provided. The method comprises magnetizing a current transformer of the power supply, the current transformer having a primary winding and a secondary winding, the secondary winding being coupled to a load via an inductive circuit, wherein magnetizing the current transformer comprises using a current and keeping the secondary winding substantially open. The method further comprises substantially saturating a magnetic core of the current transformer. The method further comprises generating periodic voltage pulses across the secondary winding of the current transformer, the voltage pulses occurring near in time to a zero line crossing of current in the current transformer and having a stable volt-second ratio.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Applicants have appreciated that conventional power supplies for powering sensors used to monitor utility power lines are unsatisfactory. Conventional AC to DC power supplies have multiple drawbacks. For instance, conventional AC to DC power supplies are unable to convert a high magnitude AC input current, as is often found on utility power lines, to a low magnitude DC output current suitable for powering modern day electronics making up a sensor. Similarly, conventional AC to DC power supplies utilizing a current transformer are unable to limit the secondary winding current of the transformer as the input current increases. Conventional AC to DC power supplies are also unable to convert an AC input current of widely varying magnitude, such as that often found on utility power lines, to a constant DC output current. Furthermore, conventional AC to DC power supplies for powering utility line sensors include one or more active components and therefore are not energy efficient.

Figure 13:
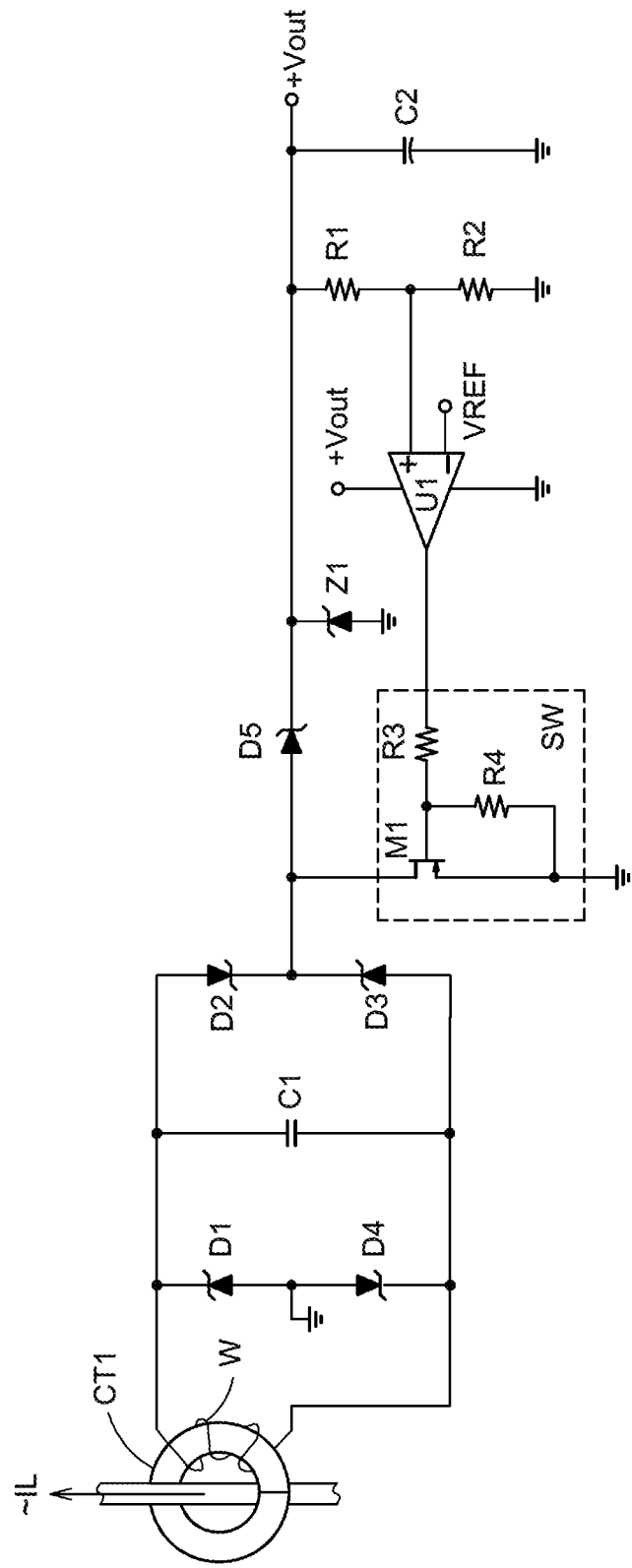
FIG. 13 illustrates a circuit schematic of a conventional power supply switching circuit providing a voltage output.

For instance, referring to the conventional power supply of FIG. 13, the various AC current reduction measures included in the circuit limit the DC current available for an electronic block at low power line current conditions. Also, since the current transformer CT1 operates in a linear mode, the output current of the secondary winding is proportional to power line current, meaning that for a high power line current the current transformer CT1 output current can be tens of times higher than is needed to power an electronic block (assuming a few hundred turns of the secondary winding W). Such undesirably high output currents at high power line conditions result in high currents in the rectifier diodes D1-D4 and in the transistor M1 of switch SW, which will overstress the secondary winding W and various others of the circuit components. Also, as noted in FIG. 13, the power supply includes active components. In general, then, the power supply of FIG. 13 features excessive complexity, low efficiency and low reliability for high voltage power line applications.

In the case of conventional battery-powered sensors, the sensors necessarily require maintenance since the battery has a finite lifetime. Such maintenance can involve replacing the battery or the entire sensor. Given that utility power networks are often extensive in size and include power lines that are often difficult to reach or otherwise access, such routine maintenance can be labor and cost intensive, and therefore limits the widespread deployment of such sensors throughout a utility power network.

According to one aspect, Applicants have discovered that the output current of a current transformer in a power supply, as well as a DC current (which may be considered an output current of the power supply in some embodiments) generated by the power supply, can be regulated by operating the current transformer in saturation. The rate of saturation of the current transformer may be approximately proportional to the AC of a power line feeding the power supply, which may improve the regulation of the transformer current. Thus, according to one aspect, Applicants have discovered that an AC to DC power supply using a front end current transformer operating in magnetic saturation provides a suitable power supply for converting the AC current of a power line to a DC current for powering sensors or other loads (e.g., other electronic equipment). According to one aspect, Applicants have discovered that the power supply may be constructed using an inductive circuit coupled to the current transformer that includes only passive components. The use of only passive components may simplify circuit design, increase durability (i.e., robustness) and improve energy efficiency.

Thus, according to one aspect, a power supply is provided which comprises a current transformer coupled to an inductive circuit. Inductive circuits as described herein may be characterized by an inductive input or by an input current that lags a corresponding input voltage. The current transformer may comprise a core that is adapted to be placed at least partially around a power line (e.g., a wire, a cable, a power bus, or other suitable conductor), such as a utility power line, and may further comprise a winding (i.e., a secondary winding) that provides a transformer output current in response to an AC current in the power line. The winding may be coupled to an inductive circuit that includes an inductor in series with the current transformer, where the inductor may (and in a preferred embodiment does) operate in a linear mode. In some embodiments, the current transformer and the inductive circuit may be configured in combination to cause the current transformer to operate in magnetic saturation. The inductive circuit may provide a DC current in response to an AC current in the power line, and the DC current may be used to power a sensor or other load. In some embodiments, the DC current may be substantially constant despite variation in the magnitude of the AC current in the power line, for example despite variation from 3 Amperes (Amps or "A") to 10 kiloAmperes (kA) in some embodiments.

In some embodiments of the described aspect, the power supply may also include one or more energy storage devices, such as but not limited to supercapacitors. The energy storage devices may be charged by the current from the inductive circuit, and may operate as power backup in the event of an interruption of the AC current in the power line, providing power to the sensor or other load. In this manner, the power supply may operate suitably despite interruptions or other variations in the AC current in the power line, and thus may be an uninterruptible power supply.

According to another aspect, an AC to DC power supply is provided that includes a current transformer configured to operate in magnetic saturation. The current transformer may receive an AC input current, for example from a utility power line or any other suitable source, and operate in magnetic saturation for a wide range of magnitudes of the AC input current. The current transformer may produce a current transformer output current which is then converted by the power supply into a DC current.

According to another aspect, a method of converting an AC input current $I_L$ to a DC current comprises producing a current transformer output current $I_O$ in response to the AC input current and then providing the current transformer output current to an inductive circuit that produces the DC current $I_{DC}$. The inductive circuit may include an inductor in series with the current transformer, and in some embodiments the current transformer may operate in magnetic saturation while the inductor operates in a linear inductive mode. The DC output current $I_{DC}$ as well as the root mean square (rms) value of the transformer output current $I_O$ may be substantially constant despite variation, and in some cases substantial variation, in the magnitude of the AC input current $I_L$.

The above-described aspects, as well as additional aspects, are now described in greater detail. These aspects can be used independently, all together, or in any combination of two or more.

Figure 1:
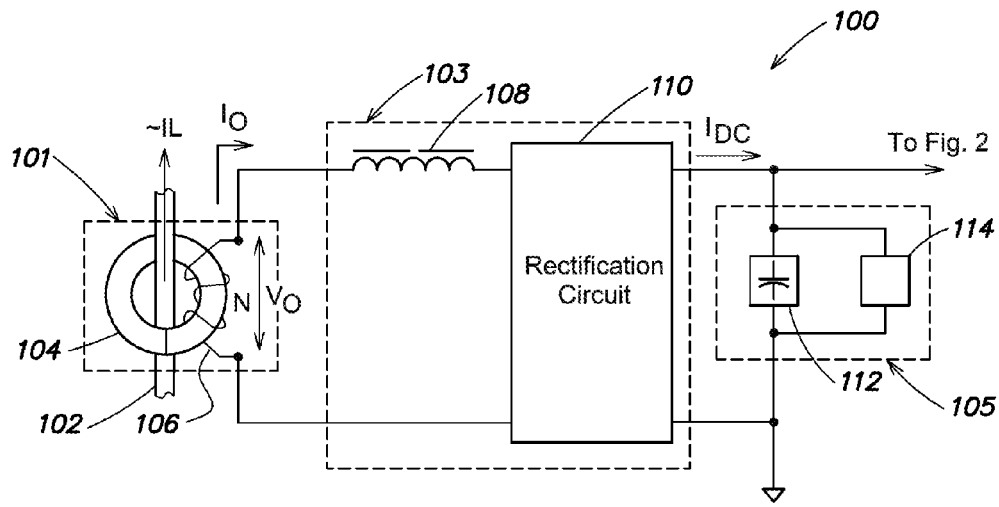
FIG. 1 is a block diagram representation of an alternating current (AC) to direct current (DC) power supply according to one non-limiting embodiment of the present invention.

As mentioned above, according to one aspect, a power supply comprises a current transformer coupled to an inductive circuit. FIG. 1 illustrates a non-limiting example. As shown, the power supply 100 includes a current transformer 101 adapted to be placed about a power line 102, and coupled to an inductive circuit 103. The power supply 100 in this non-limiting embodiment further comprises an energy storage block 105, which may be any suitable storage block (and which may be referred to herein alternatively as an energy storage device or circuit).

The transformer 101 includes a core 104 which may be adapted to be placed about the power line 102. The power line 102 may be, for example, a utility power line or other transmission line, or any other power line, as the various aspects described herein are not limited to the type of power line. Moreover, the power line may take any suitable form (e.g., a wire, a cable, a power bus, or other suitable conductor). The power line 102 carries a current $I_L$, which may be an AC current. The current $I_L$ may be the input to the current transformer 101, such that the power line 102 may be thought of as the primary "winding" of the current transformer, although it should be appreciated that in at least some embodiments, such as that shown in FIG. 1, the power line 102 is not wound around the core 104, but rather passes through the core 104. Not all embodiments are limited in this manner, however, as the various aspects may operate with power lines that are wound about the core of the current transformer to form a primary winding. Furthermore, the power line, whether wound around the core 104 or passing through the core 104 may be referred to herein as the "primary" of the transformer or the "transformer primary" to signify its role as providing an input to the transformer.

The core 104 may have any suitable size and shape and may be formed of any suitable material. In some embodiments, the core 104 may be magnetic, for example being formed of a material which concentrates the magnetic flux through the core. For example, in one non-limiting embodiment, the core 104 may comprise or be formed of a ferrite, though other suitable materials may be used. The core may be a high μ material, for example having a magnetic permeability μ greater than or equal to approximately 5,000 (e.g., approximately 6,000, approximately 8,000, approximately 10,000 or more, as non-limiting examples), although not all embodiments are limited in this respect. As will be described in greater detail below, the transformer may be a non-gapped transformer in that the core 104 may be non-gapped, and the core may have a rectangular magnetization loop B(H) (as opposed to being a linear non-gapped core). A non-gapped configuration of the transformer may facilitate operation of the current transformer in magnetic saturation, for example by lowering the minimum magnitude of the input current from power line 102 needed to place the transformer in magnetic saturation.

The transformer 101 further comprises a winding 106 which may function as an output winding (i.e., a "secondary" winding) of the current transformer 101, and which may have a voltage $V_o$ across it. Thus, the winding 106 may provide an output voltage and current of the current transformer to the inductive circuit 103. The winding 106 may be made of any suitable material (e.g., copper or any other suitable conductive material) and may have any number of turns. As will be described further below, the number of turns N of the winding 106 may be selected based on the desired value of the output current $I_O$ at minimum operational line current $I_L$, and in some embodiments may be selected in combination with a particular cross section and permeability of the magnetic core 104. As a non-limiting example, the winding 106 may include a few hundred turns (e.g., between 120 turns and 150 turns, between 100 turns and 600 turns, between 50 turns and 200 turns, between 200 turns and 500 turns, or any other suitable number) when the magnetic core 104 has a magnetic permeability greater than approximately 5,000 (e.g., approximately 10,000) and a rectangular cross-section of approximately 50 mm by 15 mm, though not all embodiments are limited in this manner The inductive circuit 103 may take any suitable form for converting the output current $I_O$ from the current transformer to a DC current $I_{DC}$. The current $I_{DC}$ may be considered an output of the power supply in some embodiments (e.g., being output by the inductive circuit in the non-limiting example of FIG. 1), though in some embodiments it may be considered an internal current of the power supply since a portion of the current may go to components of the power supply (e.g., the energy storage block 105) as opposed to being provided entirely external to the power supply. In some embodiments, the inductive circuit includes an inductor configured to operate in a linear inductive mode, which may, in combination with the operation of the current transformer in magnetic saturation, facilitate generation of the DC current $I_{DC}$, and in particular may facilitate maintaining a substantially constant magnitude of $I_{DC}$ over a wide range of magnitudes of $I_L$. For example, the DC current $I_{DC}$ may have a substantially constant magnitude irrespective of the magnitude of the AC current $I_L$ for any magnitude (i.e., any and all magnitudes) of the AC current in the range from approximately 5 Amperes (A) to approximately 1000 Amperes, within the range from approximately 10 Amperes to approximately 500 Amperes, within the range from approximately 100 Amperes to approximately 300 Amperes, within the range from approximately 1000 Amperes to 10 kiloAmperes, or within any other suitable range, including ranges having greater magnitudes than the magnitudes listed above. Furthermore, in some embodiments the inductive circuit 103 may include only passive components, which may improve the energy efficiency of the power supply, among providing other benefits.

In the non-limiting example of FIG. 1, the inductive circuit 103 comprises an inductor 108 and a rectification circuit 110, although other configurations are also possible. According to one aspect, the inductor 108 may be configured electrically in series with the current transformer 101 to receive the output current $I_O$ from the winding 106. The rectification circuit may be any suitable rectification circuit, non-limiting examples of which are described further below with respect to FIGS. 4 and 5. The inductor 108 may take any suitable form and value to ensure that it operates in a linear inductive mode (also referred to herein as a "linear inductive region."). For example, the total circuit resistance of the power supply may be balanced with the inductance value of the inductor and the turns ratio of the current transformer to ensure that the regulated output current remains below levels that might drive the inductor 108 into saturation. With this in mind, the inductor 108 may be selected to exhibit high inductance (e.g., between 100 mH-1 H) and high stability for an expected range of values of $I_O$. In some embodiments, the inductor 108 may comprise or be formed of a high flux density magnetic material or alloy, or may be formed of low frequency, low cost magnetic materials such as laminated steel, as non-limiting examples. Use of such materials may enable the inductor 108 to have small dimensions. In low power applications, the inductor may comprise or be formed of a ferrite core material. Non-limiting examples of suitable inductors may include those in the EPCOS series B82522V from EPCOS AG of Munich, Germany, those in the RENCO series RL-7300-5 from Renco Electronics of Rockledge, Fla., and those in the VISHAY series TE-5 from Vishay Intertechnology, Inc. of Malvern, Pa.

As shown in FIG. 1, the power supply 100 also includes an energy storage block 105. The energy storage block 105 may operate to filter the current $I_{DC}$ and/or to store energy in the event of blackouts or other power interruptions of the power line current $I_L$. Thus, the energy storage block 105 may be thought of as a backup current source of the power supply 100.

The energy storage block 105 may include any suitable components and take any suitable form for storing charge and providing power in the event of a break (i.e., an interruption) in the current $I_L$. In the non-limiting example of FIG. 1, the energy storage block 105 includes a capacitor 112 and a voltage clamp 114, though other configurations are also possible. The voltage clamp 114 is configured to prevent an overvoltage condition occurring across the capacitor, and may take any suitable form. According to one non-limiting embodiment, the capacitor 112 is a supercapacitor and the clamp 114 is a precision shunt regulator (also referred to herein as a "precision voltage reference integrated circuit"), though not all embodiments are limited in this manner.

The current $I_{DC}$ of the power supply 100 may have a substantially constant magnitude, though not all embodiments are limited in this respect. By operating the current transformer 101 in saturation, the volt-second ratio of the voltage pulse across the winding 106 remains substantially unchanged despite fluctuations in the current $I_L$. Thus, the average voltage applied to the inductive circuit 103 during a half-period remains substantially unchanged despite variations in the current $I_L$, resulting in the average current in the inductor 108, winding 106, and the current $I_{DC}$ remaining substantially constant despite variations in the current $I_L$. The ability of the power supply 100 to provide a substantially constant DC current $I_{DC}$ despite variations of the input current $I_L$ may be beneficial in situations in which the AC current $I_L$ is prone to change, as is common with utility power line applications.

Figure 2:
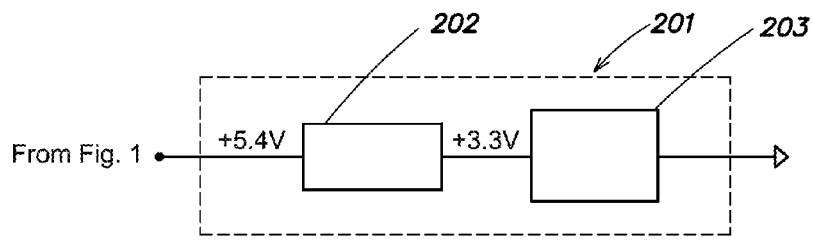
FIG. 2 is a block diagram representation of a load which may be powered by power supplies of the type described herein, according to another non-limiting embodiment of the present invention.

The power supply 100 may be configured to power any suitable load, and the various aspects described herein relating to AC to DC power supplies are not limited to using the power supplies in any particular application or setting unless otherwise stated. A non-limiting example of a load which may be powered by the DC current of a power supply like that in FIG. 1 is shown in FIG. 2, in which the load 201 includes a DC to DC converter 202 and an electronic block 203. The DC to DC converter may be a step down voltage regulator, a drop out voltage regulator, or any other suitable DC to DC converter. In the non-limiting example illustrated, the power supply 100 provides 5.4V to the load 201 (see FIG. 2), which may be stepped down to 3.3V for powering the electronic block. The electronic block 203 may be a sensor (e.g., a power line sensor) or any other suitable electronic block, as the various aspects relating to power supplies are not limited to using the power supplies to power any particular type of load. Other non-limiting examples of suitable loads are described further below. It should be appreciated from the non-limiting example of FIG. 2 that power supplies according to the various aspects described herein, such as power supply 100 of FIG. 1, may be suitable for powering loads that require relatively low input voltages. However, the power supplies described herein are not limited to being used in such applications.

Figure 3:
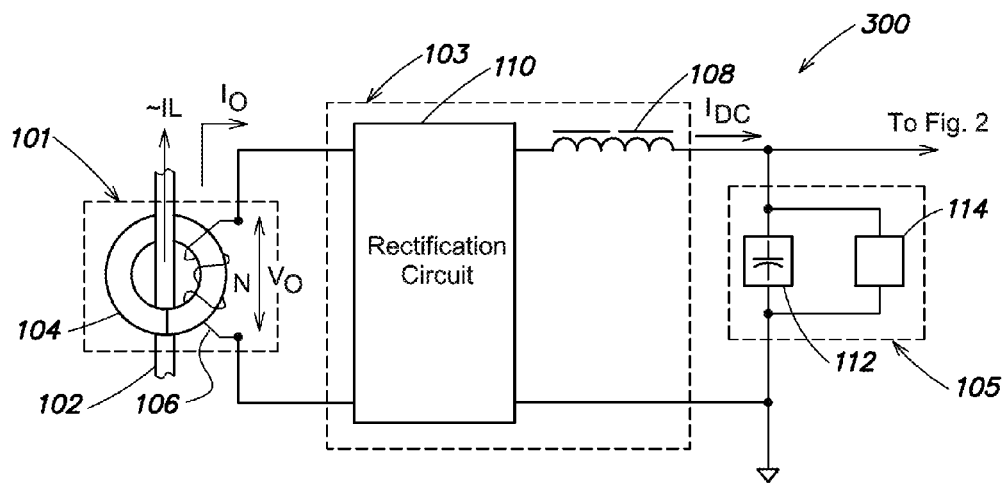
FIG. 3 is a block diagram representation of an AC to DC power supply according to an alternative non-limiting embodiment to that illustrated in FIG. 1.

While FIG. 1 illustrates one non-limiting example of the configuration of a power supply according to a first aspect, it should be appreciated that alternative configurations are also possible. FIG. 3 illustrates one non-limiting alternative to the power supply 100. As shown, the power supply 300 is formed of the same components as the power supply 100, but arranged differently. In particular, in the power supply 300 the rectification circuit 110 is coupled directly to the winding 106 rather than the linear inductor 108 being coupled directly to the winding 106 as in FIG. 1. In the power supply 300, the linear inductor 108 is coupled to the output of the rectification circuit.

While FIGS. 1 and 3 illustrate non-limiting examples of power supplies according to one or more of the various aspects described herein, it should be appreciated that other variations are also possible. Thus, the various aspects are not limited to the examples of FIGS. 1 and 3.

Non-limiting detailed examples of the power supplies 100 and 300 illustrated in block diagram form in FIGS. 1 and 3 are now described for purposes of illustration. It should be appreciated that variations on the following examples are possible.

Figure 4:
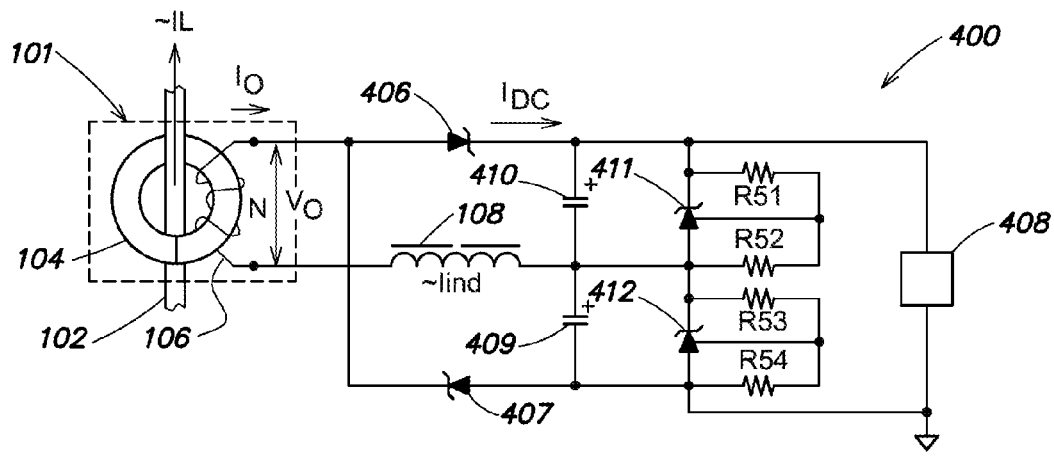
FIG. 4 is a detailed circuit schematic of a non-limiting embodiment of a power supply of the type illustrated in FIG. 1.

FIG. 4 illustrates a power supply 400 of the type illustrated in FIG. 1. The power supply 400 includes the current transformer 101 and the linear inductor 108. A half bridge rectifier doubler circuit includes diodes 406 and 407 together with series capacitors 409 and 410. The diodes 406 and 407 may be Schottky diodes or any other suitable type of diodes. The series capacitors 409 and 410 serve as energy storage devices and in one embodiment may be supercapacitors, although the power supply 400 is not limited to using supercapacitors. Because supercapacitors have low impedance, they can exhibit low voltage ripple, which may be desirable in some scenarios. The power supply 400 powers a load 408, which may be a current sensor or any other suitable type of load.

The power supply 400 further comprises precision voltage reference integrated circuits (ICs) 411 and 412 connected in parallel with capacitors 410 and 409, respectively. The precision voltage reference ICs are also referred to herein as "precision shunt regulators." The precision voltage reference ICs 411 and 412 regulate the voltage across the capacitors 409 and 410, and thus prevent overvoltage situations from occurring. A first resistor divider formed by resistors R51 and R52 allows the voltage reference of precision voltage reference IC 411 to be adjusted to a desired value. Similarly, a second resistor divider formed by resistors R53 and R54 allows the voltage reference of precision voltage reference IC 412 to be adjusted to a desired value. The use of precision low power (e.g., 0.25W-0.5W) voltage reference ICs 411 and 412 may facilitate charging the capacitors 409 and 410 to the maximum allowable voltage, and may be made possible because of the substantially constant rectified current inside the power supply 400.

Non-limiting examples of the component values for the power supply 400 are now given for purposes of illustration. In one embodiment, the inductor 108 may have an inductance between 250 milliHenry and 350 milliHenry (e.g., 330 milliHenry). However, a wider range of inductances may provide greater flexibility in tuning the circuit to provide a desired DC current level. For example, in some embodiments, the inductor 108 may have an inductance between 100 milliHenry and 1 Henry. The capacitors 409 and 410 may each have a capacitance of 150 Farads and be rated for a voltage of 2.7 Volts. Diodes 406 and 407 may be 30 Volt, 0.5 Amperes Schottky diodes. Resistor R51 and R53 may have resistances of approximately 10.7 kiloOhms. Resistors R52 and R54 may have resistances of approximately 9.1 kiloOhms. Each of the precision voltage reference ICs 411 and 412 may be a commercially available shunt regulator, such as Part # AP 432ASAG-7 from Diodes Inc of Dallas, Tex. The current transformer 101 may include a ferrite core 104 (e.g., having a permeability μ greater than 5,000 and a rectangular cross sectional area of approximately 50 mm by 15 mm, as a non-limiting example), and the winding 106 may include between 120 and 150 turns (e.g., 140 turns) of 30 AWG solid copper winding. The number of turns may be selected to provide a desired voltage and/or current strength output from the current transformer in response to a given input current. In some non-limiting embodiments, the number of turns may be selected in accordance with application of Equations (1)-(7) described below. Moreover, in at least some embodiments the values of any of the circuit parameters (e.g., inductance values, resistances, etc.) may be selected based on consideration of Equations (1)-(7). It should be appreciated that the listed parameters are provided merely for purposes of explanation and that various alternative values for one or more of the components may be used.

Figure 8:
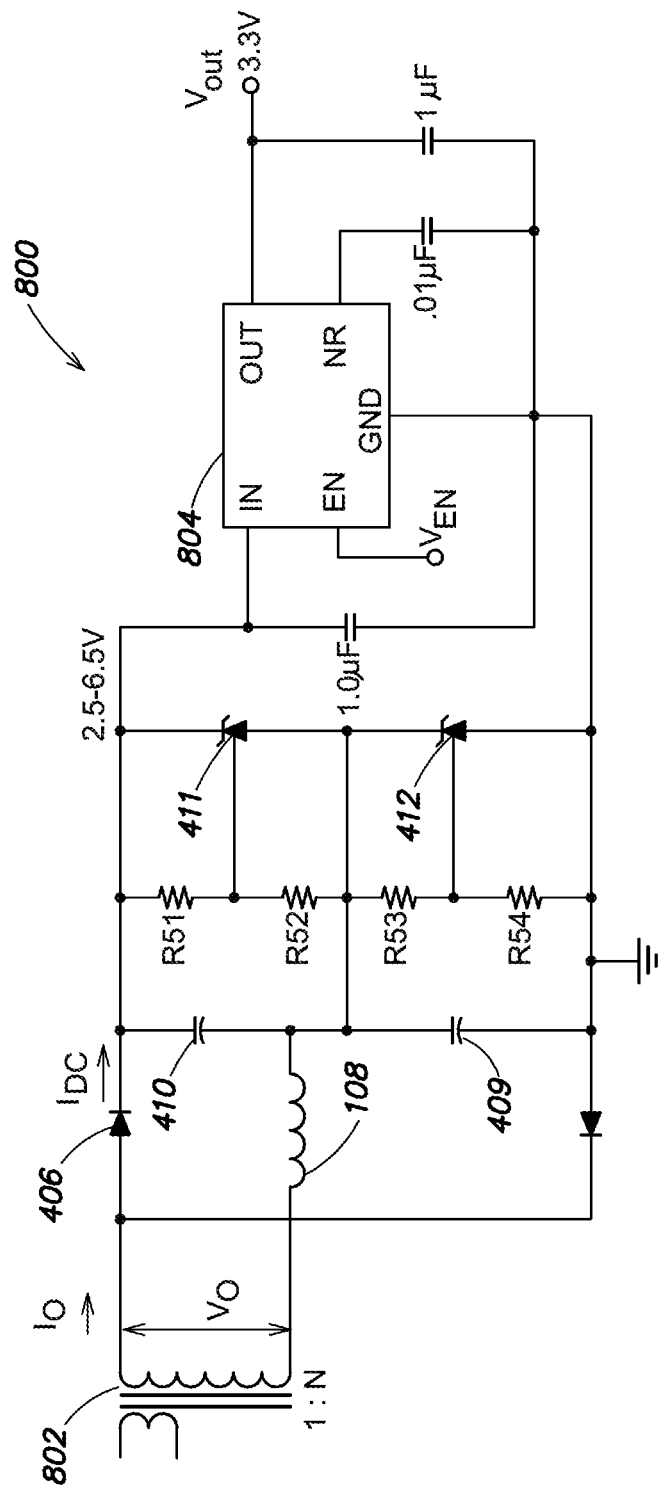
FIG. 8 illustrates a variation of the power supply 400 including a low voltage dropout regulator, according to a non-limiting embodiment of the present invention.

FIG. 8 illustrates a slight variation of the power supply 400 to include a low voltage dropout regulator. As shown, the power supply 800 includes a 1:N turn current transformer 802, which in this non-limiting embodiment may be a 1:140 turn current transformer, although other ratios are also possible. The power supply produces a DC current $I_{DC}$ which may range in voltage between 2.5 V to 6.5 V, as non-limiting examples. $I_{DC}$ is input to a low voltage dropout regulator 804, which in turn provides a 3.3 V output $V_{out}$. Referring to FIG. 2, the low voltage dropout regulator 804 may correspond to DC to DC converter 202.

For purposes of explanation, the principle of operation of the power supply 400 is now described. The described principles apply generally to power supplies of the type illustrated in both FIGS. 1 and 3, and thus reference to the power supply of FIG. 4 is used merely for illustration.

As shown in FIG. 4 (and other figures herein), the current transformer generates a voltage $V_o$ on its output side (i.e., across the secondary winding 106). The voltage $V_o$ is given by the following equation:

$$V_o = NA dB/dt, \quad (1)$$

where N is the number of turns of the secondary winding 106, A is the cross sectional area of the core 104, and B is the flux density through the core 104.

The resulting behavior of $V_o$ depends on whether the current transformer operates in saturation. As has been described, according to at least some of the embodiments described herein, the current transformer of a power supply is operated in magnetic saturation. However, for some low values of the current $I_L$, the current transformer may not reach saturation, but rather may operate in a linear magnetizing mode (i.e., when the current transformer operates in the linear area of the rectangular core magnetization loop B(H) shown in FIG. 11, that is, in between the $+B_s$ and $-B_s$ saturation flux densities). Such a scenario may arise when the magnetizing current through the power line 102 (i.e., current $I_L$) is relatively low (e.g., between approximately 0-5 Amps, as a non-limiting example). As will be described further below, the load current in such a scenario is variable. Thus, for completeness, description of the current transformer operation in a linear mode (as opposed to magnetic saturation) is also described.

When the current transformer 104 operates in a linear mode, the voltage $V_o$ generated across the secondary winding is substantially sinusoidal in response to a sinusoidal input current $I_L$. The maximum root-mean-square (rms) voltage for such a situation is given by:

$$V_o(\text{rms}) = 4.44 B_s NAf, \quad (2)$$

where N and A are the same as for equation (1), $B_s$ is the saturation flux density of the core 104, and f is the line current frequency (for example, 60 Hz).

Assuming that the capacitors 409 and 410 are discharged and that $V_o$ is applied fully to the inductor 108, the rms voltage Vo is given by:

$$V_o(\text{rms}) = X_L I_{ind} = I_{ind} \times 2\pi f L, \quad (3)$$

where XL is the impedance of inductor 108, $I_{ind}$ is the inductor rms sinusoidal current, L is the inductance value of the inductor, and f is as previously described for equation (2).

By solving equations (2) and (3) together, the initial regulated inductor rms current $I_{L1}$ is given by:

$$I_{L1} = 0.71 B_s NA/L \quad (4).$$

The rectified initial current $I_{DC}$ in FIG. 4 is thus given by:

$$I_{DC} = 0.32 B_s NA/L \quad (5).$$

Figure 11:
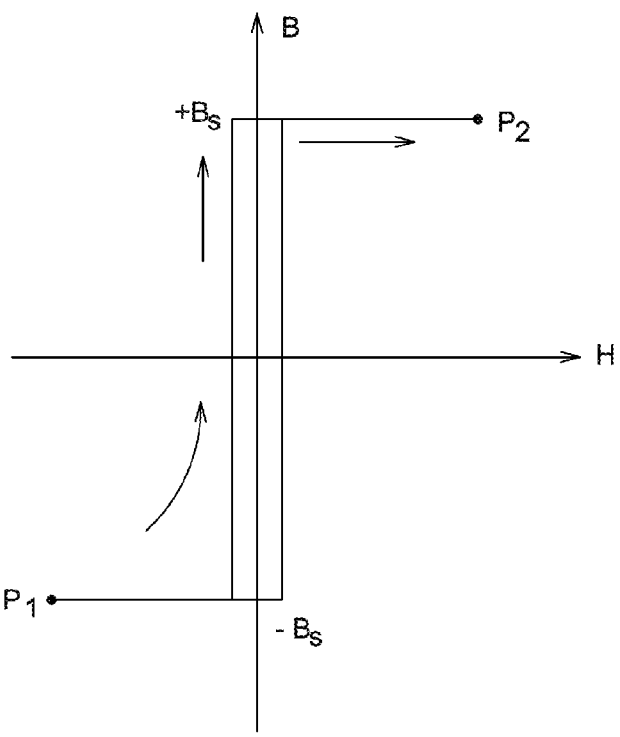
FIG. 11 illustrates a magnetization loop B(H) of a transformer core according to one non-limiting embodiment.
Figure 12:
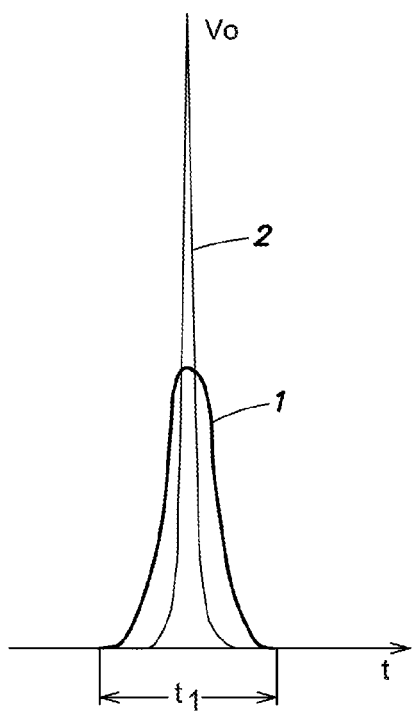
FIG. 12 illustrates voltage pulses generated at the output of a current transformer according to one non-limiting embodiment.

When the current transformer 101 operates with the core 104 in magnetic saturation as opposed to in a linear mode (for instance, when magnetizing from point $P_1$ to point $P_2$ along the rectangular magnetization loop in FIG. 11), the voltage $V_o$ takes the form of a narrow high voltage pulse, two examples of which are shown in FIG. 12. The pulse is generated approximately when magnetizing the core between the saturation flux density levels $+B_s$ and $-B_s$ shown in FIG. 11. The greater the power line current $I_L$, the greater the magnetizing speed dB/dt and the higher the amplitude of the $V_o$ voltage pulse and the shorter the duration of the $V_o$ pulse. The peak of the pulse of $V_o$ can reach 200-300V or higher (e.g., between 200-400V or even higher), as non-limiting examples, which is applied to the inductive circuit in FIG. 4. Meanwhile, the load voltage may be low (e.g., 2.7-5.4V).

FIG. 12 illustrates two pulses of $V_o$ corresponding to different magnitudes of the current $I_L$ when the current transformer is operating in magnetic saturation. The pulse wave form 1 corresponds to a much lower line current than the pulse wave form 2. However, both pulses have an equivalent volt-second area and when applied to the inductive circuit of the power supply will create a substantially equivalent average current in the inductor. Thus, the current $I_{DC}$ may remain unchanged (i.e., substantially constant) despite variations in the magnitude of $I_L$.

As mentioned, when the current transformer operates in saturation, the pulses of $V_o$ are generated across the secondary winding 106 at a time near the zero crossing of the current $I_L$ in the power line 102. During half of a period of the current $I_L$ the magnetic core is magnetized from point $P_1$ to point $P_2$ or vise versa (see FIG. 11). A voltage pulse is generated with a swing of the flux density B. By integrating both sides of equation (1) during this swing interval, the following equation can be derived:

$$\int_0^{t_1} V_0\, dt = \int_{-B_s}^{+B_s} NA\, dB, \qquad (6)$$

Where $t_1$ is the time interval of the voltage pulse of $V_o$, as shown in FIG. 12.

The left portion of equation (6) is the volt-second value of the voltage pulse (see FIG. 12). The right portion can be presented as:

$$\int_0^{t_1} V_0\, dt = 2 B_s NA, \qquad (7)$$

As can be seen from Equation (7), the volt-second value of voltage pulses generated by the current transformer in saturation mode does not depend on the line current $I_L$. Since the voltage pulses are much shorter in duration than half of a period T of the line current $I_L$ ($t_1 \ll T/2$), the pulses act like stable rectangular pulses with the same duration $t_1$ and volt-second value. When stable voltage pulses are applied to the input of the linear inductive circuit they generate stable (regulated) currents in the inductor and other components of the power supply. To ensure a linear inductive circuit in the power supply, the rectification circuit may (and in some cases should) operate in a continuous conduction mode. In a continuous conduction mode, the inductor does not discharge to zero before the current reverses polarity.

By using transformer cores of the type described herein (e.g., a ferrite core material), the magnitude of the current $I_L$ needed to saturate the core may be negligibly low (e.g., below 5 Amps). Thus, any period of operation of the current transformer 101 in a linear mode as opposed to magnetic saturation may be very short, and the corresponding line current $I_L$ range in which $I_{DC}$ may be variable may likewise be very narrow.

Figure 9:
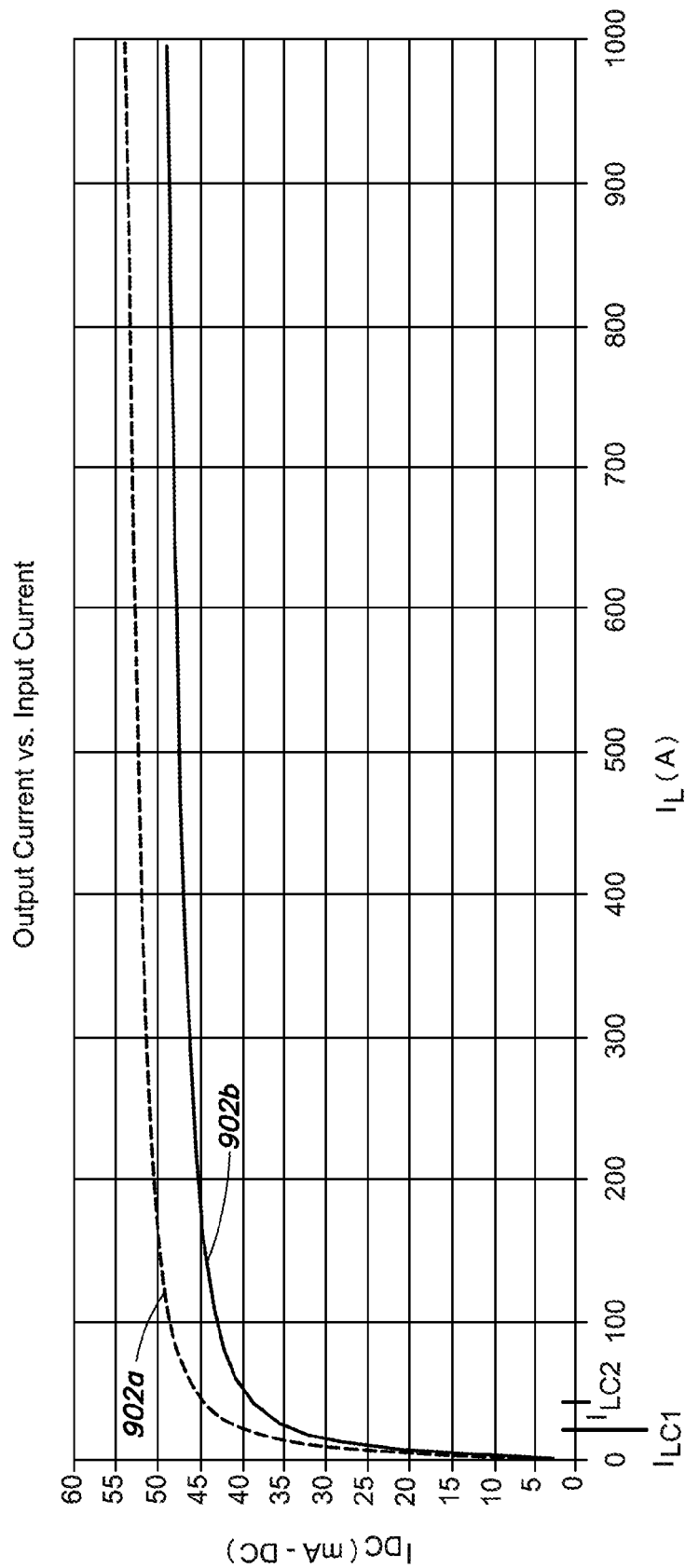
FIG. 9 is a graph illustrating the current $I_{DC}$ of a power supply of the type illustrated in FIG. 4 as a function of input current, according to a non-limiting embodiment.
Figure 10A:
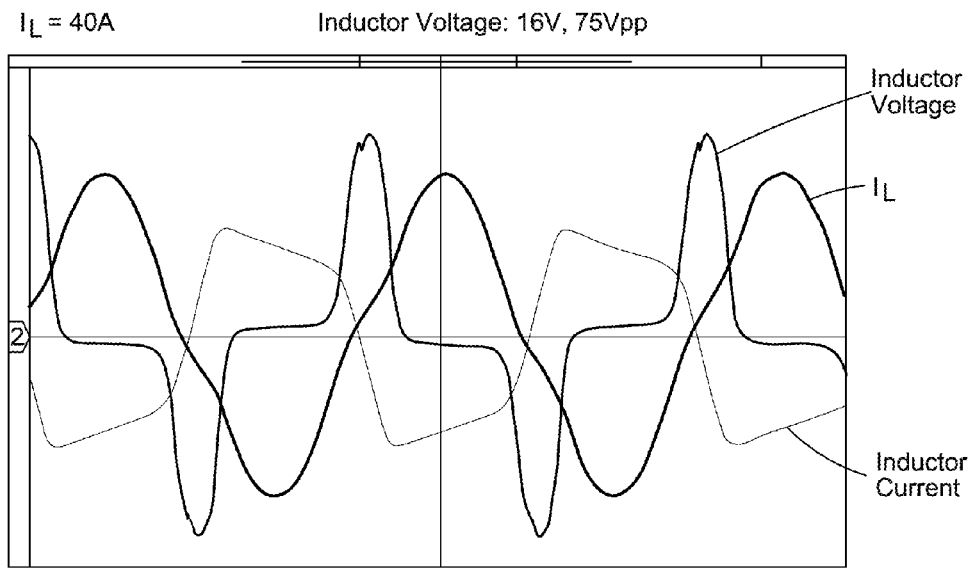
FIGS. 10A and 10B illustrate representative waveforms associated with operation of a power supply of the type illustrated in FIG. 4, according to a non-limiting embodiment.
Figure 10B:
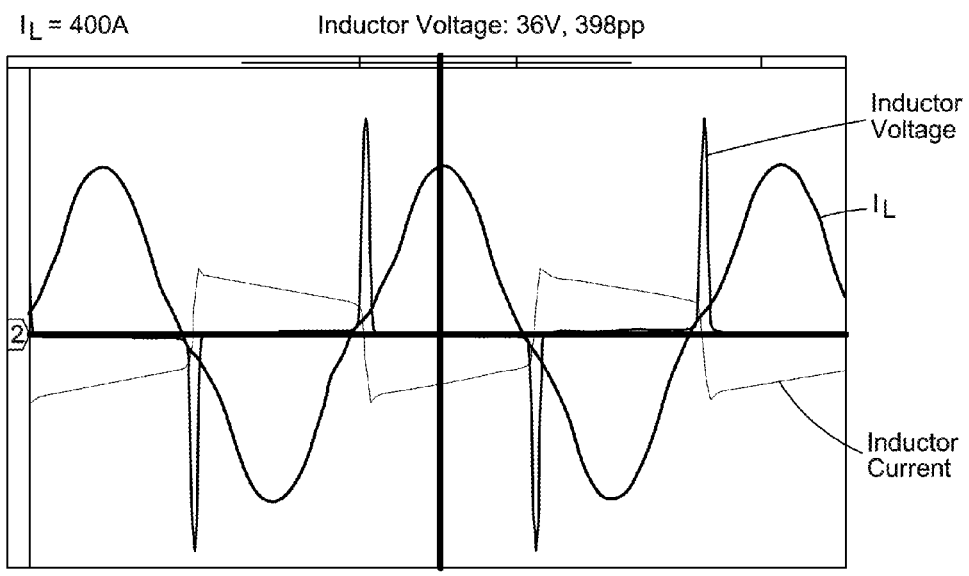

For purposes of illustration, some representative operational plots are now described with respect to the operation of a power supply of the type shown in FIG. 4. FIG. 9 illustrates a plot of the current $I_{DC}$ as a function of the current on the power line 102. FIGS. 10A and 10B illustrate representative waveforms for different magnitudes of the AC current on power line 102.

Referring to FIG. 9, a plot of the DC current $I_{DC}$ as a function of the magnitude of the AC current $I_L$ on power line 102 is illustrated for a charging mode of operation (represented by line 902a, described further below) and a steady state mode of operation (represented by line 902b, described further below). The plots can be thought of as having three regions: (i) a first region when $I_L$ is below a first critical value $I_{LC1}$; (ii) a second region when $I_L$ is between the first critical value $I_{LC1}$ and a second critical value $I_{LC2}$; and (iii) a third region when $I_L$ is greater than $I_{LC2}$.

As shown, when the current $I_L$ is below the first critical value $I_{LC1}$, the current $I_{DC}$ increases substantially linearly with an increase in $I_L$. This region may correspond to operation of the current transformer in a linear mode. The value of $I_{LC1}$ may depend on various factors, as described further below, and may be made negligibly low (e.g., below 5 A). As a non-limiting example, the value of $I_{LC1}$ for power supplies of the type illustrated in FIG. 4 may be between 3-10 A in some non-limiting embodiments. Other values are also possible.

As shown, for values of the input current $I_L$ above the first critical value $I_{LC1}$ (e.g., approximately 5 A in the non-limiting example of FIG. 9), the current $I_{DC}$ ceases to increase linearly with an increase in $I_L$, but rather the increase in $I_{DC}$ tapers off for an increase in $I_L$. This region of the plots may be thought of as the "knee" and may correspond to the transition of the current transformer from a linear mode into a saturation mode, but before the current transformer becomes fully saturated.

For values of the current $I_L$ above a second critical value $I_{LC2}$, the current $I_{DC}$ becomes substantially constant and maintains a substantially constant magnitude over a wide range of magnitudes of the AC current $I_L$ (e.g., for magnitudes of the current $I_L$ above approximately 50 A, as shown in FIG. 9, above approximately 100 A, or any other suitable value). The critical value $I_{LC2}$ corresponds to the current transformer entering a substantially fully saturated mode.

Thus, it should be appreciated from FIG. 9 that power supplies of the type illustrated in FIG. 4 may be used to produce a desired substantially constant DC current in environments in which an AC input current varies significantly.

The location of the "knee" of the curve illustrated in FIG. 9 (i.e., the location on the x-axis between $I_{LC1}$ and $I_{LC2}$) may depend on various factors, and thus may be selected by suitable choice of circuit parameters. For example, the number of turns N of the winding 106, the resistance of the winding 106 (i.e., the secondary winding resistance of the current transformer), the value of the inductor 108, and the DC resistance (DCR) of the inductor 108 may impact the location of the knee. Thus, adjustment of such parameters may adjust the location of the knee.

As should also be appreciated from the plot of FIG. 9 and the presence of the two distinct curves 902a and 902b, the power supply 400 of FIG. 4 may be thought of as having two operational modes; a "charging mode" and a "steady state mode." During the charging mode, the capacitors 409 and 410, which may be thought of as forming at least part of an energy storage block, may be charged (i.e., the capacitors 409 and 410 are not fully charged during the charging mode). During the steady state mode, the capacitors 409 and 410 may be fully charged. As shown in FIG. 9, the current $I_{DC}$ may be substantially constant within both of the modes of operation, though the value of the current $I_{DC}$ may be different for the two modes. For example, as shown, the value of $I_{DC}$ may be greater during the charging mode of operation than during the steady state mode (e.g., the value of $I_{DC}$ during the steady state mode of operation may be as much as 20% or more lower than the magnitude during the charging mode). During the steady state mode, when the capacitors are not being charged, the DC current may be absorbed by the precision reference ICs. Again, as shown, the current $I_{DC}$ may be substantially constant within each mode of operation over a large range of magnitudes of the current $I_L$. Given that supercapacitors (e.g., capacitors 409 and 410 in those embodiments in which capacitors 409 and 410 are supercapacitors) may require a rectified current to enable suitable charging, especially in situations in which the initial voltage across the capacitors is zero, it should be appreciated from the plots in FIG. 9 that power supplies according to the various aspects described herein may be beneficial for charging such capacitors.

Although not shown in FIG. 9, it should also be appreciated that in some embodiments a substantially stable DC charge current may be provided to capacitors of a power supply of the types described herein during charging mode of the capacitors (or other energy storage block). For example, during the charging mode the current provided to supercapacitors may be substantially constant despite changes in the voltage across the supercapacitors as they are charged (e.g., from zero Volts up to the maximum charged voltage of the supercapacitors). Such behavior may be advantageous in some scenarios.

In view of the foregoing discussion of FIG. 9, it should be appreciated that the current $I_{DC}$ of the power supply 400 may be thought of as being stable despite potentially alternating between different values. For example, it may be observed during operation of the power supply 400 that the current $I_{DC}$ alternates between a value represented by line 902a and a value represented by line 902b as the power supply transitions between the two modes of operation (e.g., from the charging mode to the steady state mode or vice versa). However, as shown, the current $I_{DC}$ may have a substantially constant magnitude within both modes, and thus may appear substantially stable despite variation of the input current $I_L$ at least for a large range of the input current $I_L$.

The other power supplies described herein (i.e., other than power supply 400 of FIG. 4) may exhibit similar multi-mode behavior to that described above with respect to power supply 400, i.e., they may exhibit both a charging mode of operation and a steady state mode of operation, with the current $I_{DC}$ being substantially constant within both modes.

FIGS. 10A and 10B illustrate waveforms associated with operation of a power supply of the type illustrated in FIG. 4 for two different values of the current $I_L$ on power line 102. FIG. 10A illustrates the current $I_L$, the current through the inductor 108 (labeled as "inductor current"), and the voltage across the inductor 108 (labeled as "inductor voltage") when the current $I_L$ has an rms amplitude of 40 Amperes. FIG. 10B illustrates the same three waveforms when the current $I_L$ has an rms amplitude of 400 Amperes. It should be noted that the inductor current in FIGS. 10A and 10B is reverse polarity as a result of the manner of collecting the waveforms illustrated, meaning that the inductor current has a positive value below the x-axis and a negative value above the x-axis.

While FIG. 4 has been shown and discussed as a specific, non-limiting example of a power supply of the type illustrated in FIG. 1, it should be appreciated that various alternative configurations for a power supply of the type illustrated in FIG. 1 are possible. Similarly, various configurations of power supplies of the type illustrated in FIG. 3 are possible. As non-limiting examples, rectification circuits other than that illustrated in FIG. 4 may be used in power supplies of the types illustrated in FIGS. 1 and 3. Non-limiting examples include bridge circuits and differential circuits with a center transformer winding tap, among others. For purposes of further illustration, additional non-limiting examples are shown and now described with respect to FIGS. 5 and 6. However, it should be appreciated that those examples are also non-limiting, and that further variations conforming to the general types of power supplies illustrated in FIGS. 1 and 3 are possible.

Figure 6:
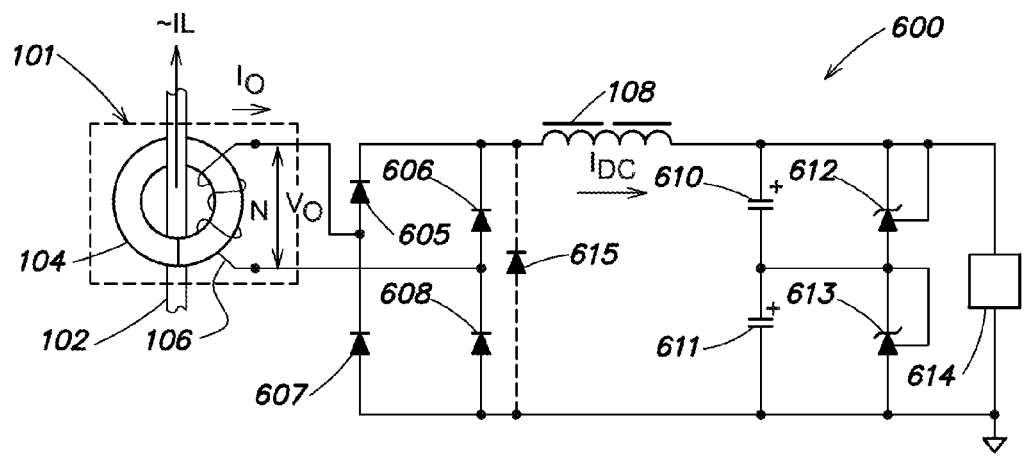
FIG. 6 is a detailed circuit schematic of a non-limiting embodiment of a power supply of the type illustrated in FIG. 3.

FIG. 6 illustrates a non-limiting detailed embodiment of a power supply of the type previously shown in FIG. 3. As a general matter, selection between the power supply 600 of FIG. 6 in which the rectification bridge circuit is directly coupled to the winding 106 and the power supply 400 of FIG. 4 in which the inductor 108 is directly coupled to the winding 106 may be made based on expected power levels for the power supply, or based on any other suitable considerations. For example, the power supply 600 may provide a substantially more constant DC current than the power supply 400 in high power applications (e.g., applications in which the power supply receives or produces tens of Watts or greater), and may also be more efficient than the power supply 400 in such applications. Compared to power supply 400, the power supply 600 may exhibit higher reverse voltages applied to diodes 605-608. Due to the high resistance of the winding 106, current $I_{DC}$ may discharge via the bridge diodes, with the discharge interval being much longer than the charge time interval. Thus, as mentioned, compared to the power supply 400, the power supply 600 may provide a substantially more constant DC current and may be more efficient. The use of optional free-wheeling diode 615 (indicated by the dashed lining in FIG. 6) may further improve the efficiency of power supply 600.

As shown, the power supply 600 includes the current transformer 101, the linear inductor 108, and a rectification bridge circuit including diodes 605-608. A load 614 is powered by the supply and therefore coupled to an output of the supply.

In the power supply 600, the winding 106 of current transformer 101 is directly connected to the rectification bridge circuit including diodes 605-608. The output of the rectification bridge circuit is coupled to the linear inductor 108, which in combination with the series capacitors 610 and 611 forms a smoothing LC filter. Placement of the smoothing LC-filter on the output side of the rectification circuit (i.e., after the rectification circuit) results in the current transformer 101 operating in saturation mode. The saturation rate of the core 104 is approximately proportional to the current $I_L$ through the power line 102.

The capacitors 610 and 611 may be substantially the same as, and operate in substantially the same manner as, the series capacitors of power supplies 400 and 500. For example, each of capacitors 610 and 611 may be a supercapacitor, although not all embodiments are limited in this respect. Precision reference voltage IC 612 may be placed in parallel with capacitor 610 to prevent overvoltage conditions from arising and to optimize the storage performance of the capacitor 610, as previously described with respect to power supplies 400 and 500. Similarly, precision reference voltage IC 613 may be placed in parallel with capacitor 611 to prevent overvoltage conditions from arising and to optimize the storage performance of the capacitor 611.

While power supply 600 represents one non-limiting detailed implementation of a power supply of the type illustrated in FIG. 3, it should be appreciated that other implementations are also possible. Thus, power supplies of the type illustrated in FIG. 3 are not limited to the form of power supply 600.

Figure 5:
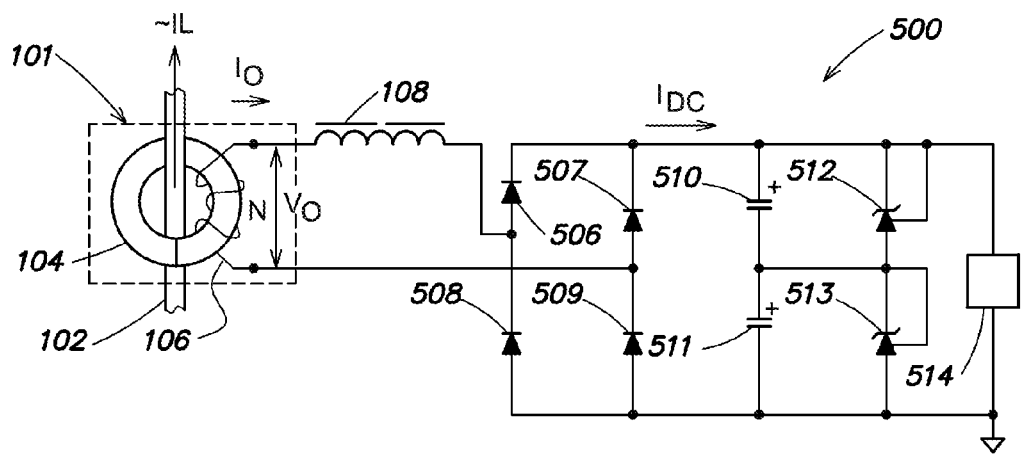
FIG. 5 is a detailed circuit schematic of a non-limiting embodiment of a power supply of the type illustrated in FIG. 1 as an alternative to that illustrated in FIG. 4.

FIG. 5 illustrates an alternative detailed embodiment of a power supply of the type illustrated in FIG. 1. The power supply 500 differs from the power supply 400 of FIG. 4 in that a full bridge rectification circuit is used as opposed to the half bridge rectifier doubler of power supply 400. The full bridge rectification circuit of power supply 500 includes diodes 506, 507, 508, and 509, which may be Schottky diodes or any other suitable type of diode.

As with the power supply 400, the power supply 500 includes two series capacitors, labeled as 510 and 511. The series capacitors 510 and 511 may be supercapacitors or any other suitable type of capacitor for energy storage. The capacitors 510 and 511 are protected from overvoltage situations by clamping circuits in the form of precision voltage reference ICs 512 and 513, respectively. Namely, the precision voltage reference IC 512 is in parallel with capacitor 510 while the precision voltage reference IC 513 is in parallel with capacitor 511.

The power supply 500 may be used to power a load 514, which may be any suitable type of load, such as any of those types previously described herein or described below.

The current transformer of any of the power supplies listed and described above with respect to FIGS. 1 and 3-6 may be configured to operate in saturation for at least some values of an input current, and preferably for a large range of values of the input current (e.g., see the plots of FIG. 9 as a non-limiting example). As mentioned previously, operation of the current transformer in variable saturation mode in response to variable AC line current $I_L$, that is primary current transformer current, may facilitate generation of a substantially constant DC rectified current. Use of an inductive circuit in combination with the current transformer operating in magnetic saturation may facilitate generation of the substantially constant DC rectified current. Thus, Applicants have appreciated that the combination of a current transformer acting in saturation combined with an inductive circuit having an inductor acting in a linear mode may be utilized to make a useful AC to DC power supply.

Accordingly, one aspect provides a power supply including a current transformer operating in magnetic saturation. The current transformer, for example current transformer 101 of power supply 100, receives an AC input current from a primary winding, such as from power line 102. The current transformer produces a current transformer output, which is processed to generate a DC current of the power supply. For example, considering the power supply 100 as a non-limiting example, the current transformer output current $I_O$ is processed by the inductive circuit 103 to produce the DC current $I_{DC}$.

Figure 7B:
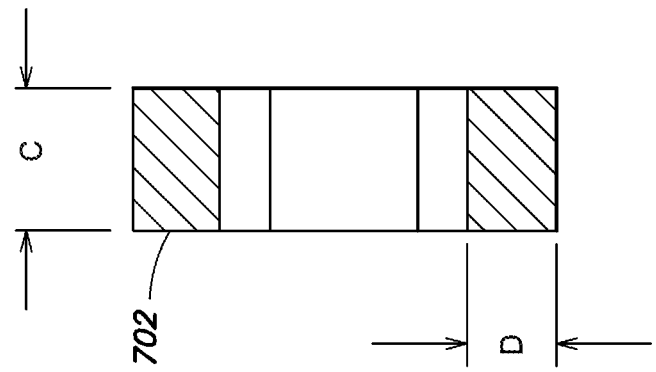
FIG. 7B illustrates a cross-sectional view of the current transformer of FIG. 7A.
Figure 7A:
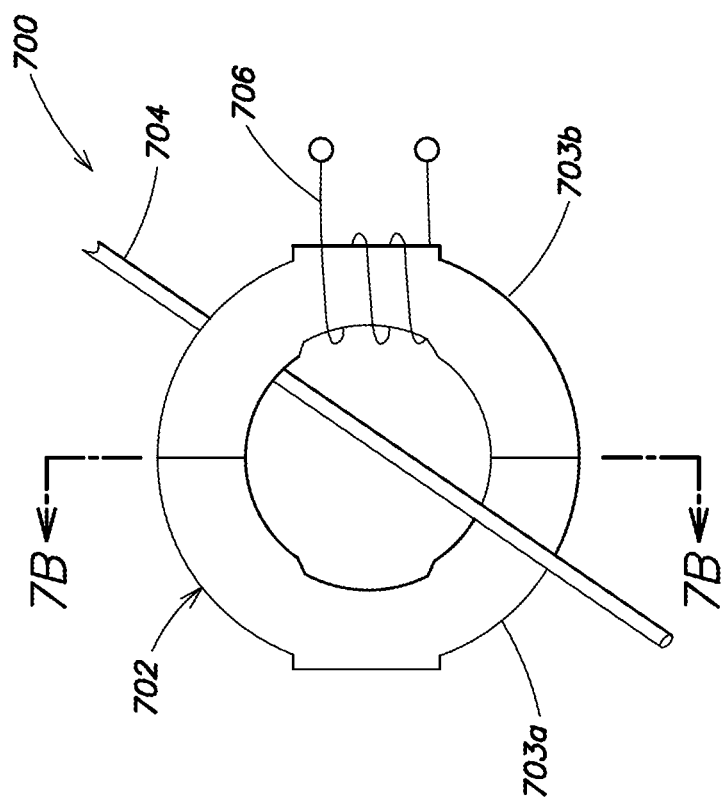
FIG. 7A illustrates a non-limiting example of a current transformer as may be used in power supplies according to one or more aspects of the present invention.

In those embodiments in which a current transformer is to be operated in saturation mode, the current transformer may be designed to facilitate achieving the saturation mode of operation. For example, the current transformer may be non-gapped, which may facilitate achieving saturation for smaller input currents than would be possible if the transformer was gapped, which may be desirable, for example, to achieve saturation over a wider range of input currents. As a non-limiting example, it may be desirable for the current transformer to start saturating at an input current of 50 Amps, 20 Amps, 10 Amps, 5 Amps, 3 Amps, or any other desired value. The design of the current transformer may be chosen to facilitate achieving saturation for a given input current. FIG. 7A illustrates a non-limiting example.

As shown, the current transformer 700, which may be used as the current transformer 101 of FIGS. 1 and 3-6, includes a core 702. The core 702 may be formed of a ferrite or any other suitable material and may be non-gapped to facilitate operating the current transformer in magnetic saturation. However, the core may comprise two or more separable pieces, labeled as 703a and 703b. In this manner, the core may be placed about a power line 704 (e.g., power line 102 of FIG. 1) and then the pieces 703a and 703b may be clamped together. In such an embodiment, the pieces 703a and 703b may be clamped together with screws or in any other suitable manner. The secondary winding 706 may be wound around at least a portion of the core 702 and may include any suitable number of turns N (e.g., between 100 turns and 300 turns or any other suitable number of turns). The core 702 may be formed of a material having permeability greater than 5,000. In one embodiment (see FIG. 7B), the core may have a rectangular cross section, though not all embodiments are limited in this respect. The rectangular cross section C×D may be approximately 50 mm by 15 mm, though other values are also possible.

While FIG. 7A illustrates a non-limiting example of a current transformer suitable for use in power supplies of the types described herein, it should be appreciated that variations are possible and that the various aspects of the invention are not limited to use with any particular type of current transformer.

Various aspects have been described above, one or more of which may provide one or more of the following advantages. As should be appreciated from the foregoing, power supplies according to some aspects may include only passive components (i.e., no active components). Thus, the power supplies may be robust, energy efficient, and simple in construction. The power supplies according to such aspects may therefore make suitable uninterruptible power supplies. Moreover, as has been mentioned, power supplies according to some aspects may be suitable for producing a desired substantially constant DC current despite wide variations of an input current. Further still, power supplies according to one or more aspects may be suitable for converting a relatively large input AC current (e.g., on the order of 1000 Amperes or more) to a relatively low DC current (e.g., between approximately 10 mA and 200 mA, such as 100 mA or any other value within this range, as a non-limiting example) and for producing relatively small output wattages (e.g., less than 10 Watts, less than 5 Watts, less than 2 Watts, between 1 and 5 Watts, or any other desired value). Other advantages may also be realized by implementation of one or more of the various aspects.

As mentioned previously, power supplies according to one or more of the various aspects may be used to drive any suitable load. One example of a suitable load previously described herein is a sensor. More generally, non-limiting examples of suitable loads include wireless transmission devices, circuit monitoring and alarming devices, lighting devices, environmental monitoring and alarming devices, surveillance and security devices, battery chargers, power line communication equipment, and broad band and TV signal amplifiers, among others. Thus, it should be appreciated that those aspects of the invention relating to powering a load are not limited to any particular type of load, but rather that numerous suitable loads may be employed.

Wireless transmission devices may include any type of telecommunication transceiver and/or repeater, and may be short-range type devices or long-range type devices. Short-range type devices may include wireless devices which operate in an active mode in the range of, for example, 20-40 mA. Long-range wireless devices may operate in an active mode in the range of, for example, approximately 60-100 mA. Current ranges other than those listed are also possible. Suitable non-limiting examples of wireless transmission devices may include WiFi devices, WiMax devices, RF devices operating in the ISM (industrial, scientific, and medical) band, or wireless devices operating in other frequency bands.

Circuit monitoring and alarming devices may include current sensors, temperature sensors, strain sensors, or motion sensors (e.g., accelerometers). Other circuit monitoring and alarming devices may also be suitably powered by power supplies according to one or more aspects of the present invention. Thus, the types of circuit monitoring and alarming devices now listed are non-limiting examples only.

Lighting devices may include beacons, markers, and indicators. Also, some LEDs may be powered using power sources of the types described herein, and thus low power level (e.g., one to five Watt) general illumination devices may also be suitable loads to be powered according to one or more non-limiting embodiments. Lighting devices may also include gas discharge lamps.

Environmental monitoring and alarming devices may include atmospheric sensors, sound level sensors, chemical sensors, and biological sensors, as non-limiting examples. Other types of environmental monitoring and alarming devices may also be used.

Surveillance and security devices may include motion sensors, cameras, videos, and alarms, as non-limiting examples. Other types of surveillance and security devices may also be used.

Also, it should be appreciated that power supplies according to one or more of the aspects described herein may be used to power multiple loads. For example, multiples loads of the types described above may be powered. As a non-limiting example, a power supply (e.g., power supply 400 of FIG. 4) may power a load that includes three current sensors. Two of the three current sensors may be dedicated to detecting fault conditions on the power line 102 while the third may be dedicated to logging data (e.g., recording normal operating current conditions). Other combinations of loads are also possible, as this is but one non-limiting example.

Having thus described several aspects of the invention, it is to be understood and appreciated that various alterations, equivalents, modifications, and improvements will readily occur to those skilled in the art. Such alterations, equivalents, modifications, and improvements are intended to be part of this disclosure, and are intended to be within the spirit and scope of the various aspects described herein. Accordingly, the foregoing description and drawings are by way of example only.

What is claimed is:

1. A power supply circuit, comprising:
a current transformer comprising a winding wrapped at least partially around a core, the core adapted to be placed at least partially around a power line, and the winding configured to provide a current transformer output current when the core is placed at least partially around the power line; and
an inductive circuit coupled to the winding to receive the current transformer output current, the inductive circuit comprising an inductor configured in series with the current transformer, wherein the inductive circuit is configured to provide a substantially constant direct current (DC) current in response to an amplitude-varying alternating current in the power line for at least one mode of operation of the power supply circuit wherein the current transformer is configured to operate in magnetic saturation.

2. A power supply circuit, comprising:
a current transformer comprising a winding wrapped at least partially around a core, the core adapted to be placed at least partially around a power line, and the winding configured to provide a current transformer output current when the core is placed at least partially around the power line; and
an inductive circuit coupled to the winding to receive the current transformer output current, the inductive circuit comprising an inductor configured in series with the current transformer, wherein the inductive circuit is configured to provide a substantially constant direct current (DC) current in response to an amplitude-varying alternating current in the power line for at least one mode of operation of the power supply circuit.

3. The power supply circuit of claim 1, wherein the inductive circuit further comprises a rectification circuit and wherein the substantially constant DC current is a rectified current.

4. The power supply circuit of claim 3, wherein the rectification circuit is coupled between the inductor and the current transformer.

5. The power supply circuit of claim 3, wherein the inductor is coupled between the current transformer and the rectification circuit.

6. The power supply circuit of claim 3, wherein the rectification circuit comprises a half bridge rectification configuration.

7. The power supply circuit of claim 3, wherein the rectification circuit comprises a full bridge rectification configuration.

8. The power supply circuit of claim 3, further comprising at least one capacitor coupled to an output of the inductive circuit.

9. The power supply circuit of claim 8, further comprising a precision reference integrated circuit (IC) coupled across the at least one capacitor and configured to limit a maximum voltage across the at least one capacitor.

10. The power supply circuit of 1, wherein the inductor is configured to operate in a linear mode.

11. The power supply circuit of claim 1, wherein the inductive circuit includes only passive components.

12. The power supply circuit of claim 1, wherein the power supply circuit includes only passive components.

13. The power supply circuit of claim 1, wherein the current transformer is a non-gapped current transformer.

14. The power supply circuit of claim 1, wherein the substantially constant DC current has a magnitude that is substantially independent of a magnitude of the alternating current in the power line.

15. The power supply circuit of claim 1, wherein the substantially constant DC current has a magnitude that is substantially independent of a magnitude of the alternating current in the power line over a range of the magnitude of the alternating current in the power line at least from approximately 100 Amps to approximately 1000 Amps.

16. An apparatus comprising a current sensor configured to monitor current through a power line in combination with the power supply circuit of claim 1, wherein the current sensor is configured to receive power from the power supply circuit.

17. The apparatus of claim 16, wherein the current sensor is configured to detect a fault condition of the power line.

18. The apparatus of claim 16, wherein the current sensor is configured to log data with respect to operation of the power line.

19. The power supply circuit of claim 1, wherein the power supply circuit is configured to operate in a charging mode in which an energy storage block is being charged, and operate in a steady state mode in which the energy storage block is not being charged, and wherein the at least one mode of operation comprises a first mode of operation corresponding to the charging mode or the steady state mode.

20. The power supply circuit of claim 19, wherein the substantially constant DC current has a first value when the power supply circuit operates in the charging mode and has a second value when the power supply circuit operates in the steady state mode.

21. The power supply of claim 9, wherein the at least one capacitor is a supercapacitor.

22. The power supply circuit of claim 1, further comprising an energy storage block, wherein the power supply circuit is configured to provide a substantially constant DC charging current to the energy storage block when charging the energy storage block, despite variations in voltage across the energy storage block.

23. The power supply circuit of claim 1, wherein the current transformer further comprises a single turn primary winding.

24. A method of operating a power supply, comprising:
producing a transformer output current from a secondary winding of a current transformer in response to an amplitude-varying alternating current being input to the current transformer;
receiving the transformer output current at an input of an inductive circuit coupled to the current transformer; and
providing a substantially constant direct current (DC) current from the inductive circuit in response to receiving the transformer output current at the input of the inductive circuit for at least one mode of operation of the power supply.

25. The method of claim 24, wherein providing a substantially constant DC current from the inductive circuit comprises operating an inductor of the inductive circuit in a linear mode.

26. The method of claim 24, further comprising rectifying the transformer output current using the inductive circuit.

27. The method of claim 26, wherein rectifying the transformer output current using the inductive circuit comprises rectifying the transformer output current with a half bridge rectifier.

28. The method of claim 26, wherein rectifying the transformer output current using the inductive circuit comprises rectifying the transformer output current with a full bridge rectifier.

29. The method of claim 24, wherein providing a substantially constant DC current from the inductive circuit comprises providing a substantially constant DC current having a magnitude substantially independent of a magnitude of the alternating current input to the current transformer.

30. The method of claim 29, wherein the magnitude of the substantially constant DC current is substantially independent of the magnitude of the alternating current input to the current transformer over a range of the magnitude of the alternating current at least from approximately 100 Amps to approximately 1000 Amps.

31. The method of claim 24, further comprising charging an energy storage block using the substantially constant DC current from the inductive circuit.

32. The method of claim 31, wherein charging the energy storage block using the substantially constant DC current from the inductive circuit comprises charging a capacitor.

33. The method of claim 24, further comprising powering a current sensor with the substantially constant DC current.

34. The method of claim 24, further comprising configuring the current transformer at least partially about a power line carrying the alternating current.

35. The method of claim 24, further comprising operating the power supply in a charging mode of operation during which an energy storage device is being charged using the substantially constant DC current from the inductive circuit, wherein the at least one mode of operation is the charging mode of operation.

36. The method of claim 35, further comprising switching between the charging mode of operation and a steady state mode of operation during which the energy storage device of the power supply is not being charged by the substantially constant DC current from the inductive circuit.

37. The method of claim 36, wherein the substantially constant DC current from the inductive circuit has a first current magnitude in the charging mode of operation, and wherein the method further comprises providing the substantially constant DC current with a second current magnitude in the steady state mode of operation.

38. The method of claim 24, further comprising operating the power supply in a steady state mode of operation during which an energy storage device of the power supply is not being charged by the substantially constant DC current from the inductive circuit, and wherein the at least one mode of operation is the steady state mode of operation.

39. A power circuit for converting an alternating current (AC) input current to a direct current (DC) current, the power circuit comprising:
a current transformer couplable to a power line, the current transformer comprising a toroidal magnetic core configured to be placed about the power line, the current transformer further comprising a secondary winding wound around at least a portion of the toroidal magnetic core;
an inductor coupled in series with the secondary winding and configured to operate in a linear mode; a rectification circuit coupled to the inductor;
a first supercapacitor; and
a second supercapcitor in series with the first supercapacitor wherein the inductor and the rectification circuit are configured in combination to receive a current from the secondary winding of the current transformer and to provide a substantially constant DC current from a first terminal corresponding to a first terminal of the first supercapacitor in response to an AC input current in the power line for at least one mode of operation of the power circuit.

40. The power circuit of claim 39, wherein the inductor has an inductance selected to cause the current transformer to operate in magnetic saturation for any magnitude of the AC input current in the power line from approximately 5 Amps to approximately 1000 Amps.

41. The power circuit of claim 39, wherein the toroidal magnetic core is a non-gapped core.

42. The power circuit of claim 39, wherein a magnitude of the substantially constant DC current is substantially independent of a magnitude of the AC input current in the power line over a range of the magnitude of the AC input current at least from approximately 100 Amps to approximately 1000 Amps.

43. The power circuit of claim 39, wherein the rectification circuit is coupled between the inductor and the current transformer.

44. The power circuit of claim 39, wherein the inductor is coupled between the current transformer and the rectification circuit.

45. The power circuit of claim 39, wherein the rectification circuit comprises a half bridge rectification configuration.

46. The power circuit of claim 39, wherein the rectification circuit comprises a full bridge rectification configuration.

47. The power circuit of claim 39, further comprising a precision reference integrated circuit coupled across the first supercapacitor and configured to limit a maximum voltage across the first supercapacitor.

48. The power circuit of claim 39, wherein the power circuit includes only passive components.

49. The power circuit of claim 39, wherein the power circuit is operable in a charging mode during which the first and second supercapacitors are being charged by the substantially constant DC current and a steady state mode during which the first and second supercapacitors are not being charged by the substantially constant DC current, and wherein the substantially constant DC current has a first magnitude in the charging mode and a second magnitude lower than the first magnitude in the steady state mode.

50. An apparatus comprising a current sensor configured to monitor current through a power line in combination with the power circuit of claim 39, wherein the current sensor is configured to receive at least part of the substantially constant DC current as a power signal.

51. The apparatus of claim 50, wherein the current sensor is configured to detect a fault condition of the power line.

52. The apparatus of claim 50, wherein the current sensor is configured to log data with respect to operation of the power line.

* * * * *